(12) United States Patent
Bourdon

(10) Patent No.: US 8,783,614 B2
(45) Date of Patent: Jul. 22, 2014

(54) JET ENGINE NACELLE INTENDED TO EQUIP AN AIRCRAFT

(75) Inventor: Gilles Bourdon, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 444 days.

(21) Appl. No.: 12/673,696

(22) PCT Filed: Jun. 12, 2008

(86) PCT No.: PCT/FR2008/000809
§ 371 (c)(1),
(2), (4) Date: Feb. 16, 2010

(87) PCT Pub. No.: WO2009/027587
PCT Pub. Date: Mar. 5, 2009

(65) Prior Publication Data
US 2011/0020119 A1    Jan. 27, 2011

(30) Foreign Application Priority Data
Aug. 20, 2007   (FR) ...................................... 07 05921

(51) Int. Cl.
*B64D 29/08*   (2006.01)
(52) U.S. Cl.
USPC .................. 244/129.4; 244/53 R; 239/265.31
(58) Field of Classification Search
USPC .............. 244/110 B, 53 R, 129.4; 239/26.33, 239/265.31, 265.255
See application file for complete search history.

(56) References Cited

U.S. PATENT DOCUMENTS 5,524,431 A * 6/1996 Brusson et al. .............. 60/226.2
6,260,801 B1 * 7/2001 Peters et al. ............... 244/110 B
6,334,588 B1 * 1/2002 Porte .......................... 244/129.4
7,146,796 B2 * 12/2006 Lair ............................. 60/226.2
7,789,347 B2 * 9/2010 Oberle et al. .............. 244/129.4
2003/0218094 A1 * 11/2003 Lair ........................... 244/110 B

FOREIGN PATENT DOCUMENTS

FR    2772342    6/1999

OTHER PUBLICATIONS

International Search Report; PCT/FR2008/000809; Feb. 18, 2009.

* cited by examiner

*Primary Examiner* — Ned Landrum
*Assistant Examiner* — Justin Seabe
(74) *Attorney, Agent, or Firm* — Brinks Gilson & Lione

(57) ABSTRACT

The invention relates to a jet engine nacelle intended to equip an aircraft, comprising a forward air inlet section, a mid-section intended to surround a fan of the jet engine, and an aft section formed from at least first and second hath-shells rotatably mounted about an axis such that they can each be deployed between a working position in which the half-shells are drawn towards one another and a maintenance position in which the half-shells are spaced apart, at least the first half-shell (11) being equipped with a first follower element (19) in a region situated at a distance from the axis of rotation, the nacelle being equipped with a first fixed guide element (28), the first follower element (19) being designed to bear against a first guide element (28) which is fixed with respect to the jet engine during the rotation of the first half-shell (11). The first half-shell (11) is equipped with a second follower element (20), offset angularly from the first follower element (19) with respect to the axis of rotation of the first half-shell (11), designed to bear against a second guide element (29) during the rotation of the first half-shell (11).

11 Claims, 7 Drawing Sheets

JET ENGINE NACELLE INTENDED TO EQUIP AN AIRCRAFT

TECHNICAL FIELD

The invention relates to a turbojet engine nacelle intended to equip an aircraft.

BACKGROUND

An aircraft is propelled by one or more turbojet engines each housed in a nacelle that also houses a collection of ancillary actuating devices associated with the operation thereof and performing various functions when the turbojet engine is operating or stationary. These ancillary actuating devices notably comprise a mechanical system for the actuation of the thrust reversers.

A nacelle generally has a tubular structure comprising an air intake forward of the turbojet engine, a middle section intended to surround a fan of the turbojet engine, a rear section which may house thrust reversal means and is intended to surround the combustion chamber of the turbojet engine, and generally ends in a jet pipe, the outlet of which is situated downstream of the turbojet engine.

Modern nacelles are often intended to house a bypass turbojet engine capable, via the blades of the rotating fan, of generating the flow of hot air (also known as the primary flow) from the turbojet engine combustion chamber.

A nacelle generally has an outer structure which, together with a concentric inner structure, defines an annular flow duct, also known as a flow path, intended to channel a flow of cold air, known as the secondary or bypass air, which passes around the outside of the turbojet engine. The primary and secondary flows are ejected from the engine via the rear of the nacelle.

Each airplane propulsion unit is thus formed of a nacelle and of a turbojet engine, and is suspended from a fixed structure of the airplane, for example under a wing or on the fuselage, via a pylon or a strut attached to the engine or the nacelle.

The rear section of the nacelle is usually formed of a first and of a second half-shell of substantially semicylindrical shape, one on each side of a longitudinal vertical plane of symmetry of the nacelle, and mounted such that they can move in such a way that they can be deployed between a work position and a maintenance position with a view to providing access to the engine. The two half-shells are generally pivot-mounted about a longitudinal axis that forms a hinge at the top part (in the 12 o'clock position) of the nacelle. The half-shells are kept in the closed position by latching devices positioned along a meeting line situated in the bottom part (in the 6 o'clock position).

Each half-shell is deployed by means of a jack one end of which is fixed and connected to the turbojet engine, and the other end of which is connected to the shell, at an upper part or in the 12 o'clock position thereof, at a point slightly offset from the hinge axis.

The middle and rear sections are, in the conventional way, joined together by a frame, the first and second half-shells generally being equipped with positioning means which, in the work position, collaborate with complementary positioning means created on the frame.

A nacelle of this type has the disadvantages set out hereinbelow.

When the nacelle is opened, that is to say when the two half-shells are distanced from one another, each half-shell has a tendency to deform. Such deformation is accentuated by the position of the jack and the associated reaction forces. Further, the maintenance operations may be performed out of doors, which means that the presence of wind further accentuates the deformations suffered by the deployed half-shells.

It will be recalled that, in general, the hinge pins are attached to the rear part of the rear section, in the upper region where the half shells meet.

Thus, when the nacelle is in the maintenance position, the ends of the half-shells placed at the lower meeting region, and at the interface between the rear section and the middle section, shift downward and toward the turbojet engine.

These ends, subjected to a great deal of movement may then interfere with the other parts of the nacelle, particularly as a result of the shifting of the ends in the direction of the turbojet engine.

In order to limit such movement of these ends, it is known practice for each half-shell to be equipped with at least one first follower element in the region situated some distance from the hinge axis, the nacelle being fitted with a fixed first guide element, the first follower element being designed to bear against the first guide element as the first half-shell rotates.

In this way, the movement of the region located some distance from the axis of rotation is limited by the follower element bearing against the fixed cam thus limiting the maximum deformation of each half-shell.

However, this type of nacelle entails the use of a guide element that is very long because it has to accompany the movement of the follower element over a significant part of the angular travel of the corresponding half-shell.

The significant size entails structural modifications to other surrounding elements that make up the nacelle.

BRIEF SUMMARY

The disclosure provides a nacelle in which the guide element takes up less space than prior nacelles.

To this end, the invention relates to a nacelle of a turbojet engine, intended to be fitted to an aircraft, comprising an air intake front section, a middle section intended to surround a fan of the turbojet engine, and a rear section formed of at least a first and a second half-shell mounted such that they are able to rotate about an axis so that each can be deployed between a work position in which the half-shells are close together and a maintenance position in which the half-shells are distanced from one another, the first half-shell at least being equipped with a first follower element in a region situated some distance from the axis of rotation, the first follower element being designed to bear against a first guide element that is fixed with respect to the turbojet engine as the first half-shell rotates, characterized in that the first half-shell is equipped with a second follower element, angularly offset from the first follower element with respect to the axis of rotation of the first half-shell, designed to bear against a second guide element that is fixed as the first half-shell rotates.

In this way, the limitation on the movement of the region situated some distance from the axis of rotation is afforded as the two half-shells separate, first of all as a result of the first follower element bearing against the first guide element and then as a result of the second follower element, which is offset with respect to the first, bearing against the second guide element. The length of each of these guide elements can therefore be short, which means that the overall space occupied by these guide means as a whole is small.

For preference, the second half-shell is also fitted with similar follower means and guide means.

According to one feature of the invention, the first and second follower elements respectively comprise a first and a second protruding lump, the first and second guide means comprising at least one bearing ramp against which the first and second lumps bear as the first half-shell rotates.

Advantageously, the bearing ramp is a single bearing ramp having a first and a second section, these being positioned in the continuation of one another and defining a first and a second guide face respectively forming the first and the second guide elements, the first lump coming to bear against the first guide face at least, the second lump coming to bear against the second guide face at least.

According to one possibility of the invention, the first and second guide faces make an angle with one another.

Advantageously, the first and/or the second follower elements are designed to bear against the first and/or the second guide elements over only part of the travel of the first half-shell.

Beyond a determined distancing of the first shell, the aforementioned end of the first shell is set back far enough with respect to the other elements of the nacelle. As a result, the aforementioned problem of interaction between the first half-shell and the other elements of the nacelle arises only for just part of the angular travel of the nacelle. The follower and guide elements therefore perform their function over just part of the travel of the first half-shell, which means that the space required by these elements can be limited still further.

According to one feature of the invention, when the nacelle is in the work position, the first and second follower elements are set back from the first and second guide elements.

The follower and guide elements therefore have no effect in the work position, that is to say do not in any way influence the nacelle during aircraft flight. In the work position, the positioning of each half-shell is thus afforded in the conventional way by an annular groove and a complementary knife edge.

For preference, the first half-shell can be rotated through an angular travel of between 40 and 60°, the first and the second follower elements collaborating with the first and the second guide elements over an angular travel of between 5 and 10°, preferably of the order of 7°.

According to one possibility of the invention, the work position is identified by an angular position at 0°, the maintenance position being identified by an angular position at between 40 and 60°, the follower elements and the guide elements being arranged in such a way that the first follower element bears against the first guide element in an angular position between about 0.3° and 4°, the second follower element bearing against the second guide element in an angular position of between about 4 and 7°.

It is then possible to be sure that the first guide element positions the first half-shell when the aforementioned annular knife edge is disengaged from the corresponding groove. Furthermore, in this way, the knife edge is correctly positioned facing the groove as the half-shells near one another, ensuring that the latter do not experience premature wear. This is all the more important given that the groove and the knife edge used for positioning are elements subject to a great deal of stress during flight and are therefore components held to be sensitive.

Advantageously, the first and second guide elements are fixed to a frame that is fixed with respect to the turbojet engine, allowing the rear section to be attached to the middle section.

According to one feature of the invention, the bearing ramp has a first and a second end, the first and second lumps moving along the ramp in the direction from the first end toward the second end as the first half-shell moves from the work position toward the maintenance position, the second end being radially distanced outward with respect to the first end.

For preference, the second end is distanced away from the first end in the direction of the middle section.

The shape of the bearing ramp, although it limits the deformation of the first half-shell, nonetheless to a certain extent replicates the natural deformation of the half-shell as it is deployed to the maintenance position.

The invention also relates to an aircraft characterized in that it comprises a nacelle according to the invention.

BRIEF DESCRIPTION OF THE DRAWINGS

In any event, the invention will be better understood from the description which follows, with reference to the schematic attached drawing which, by way of example, represents one embodiment of this nacelle.

DETAILED DESCRIPTION

Figure 1:
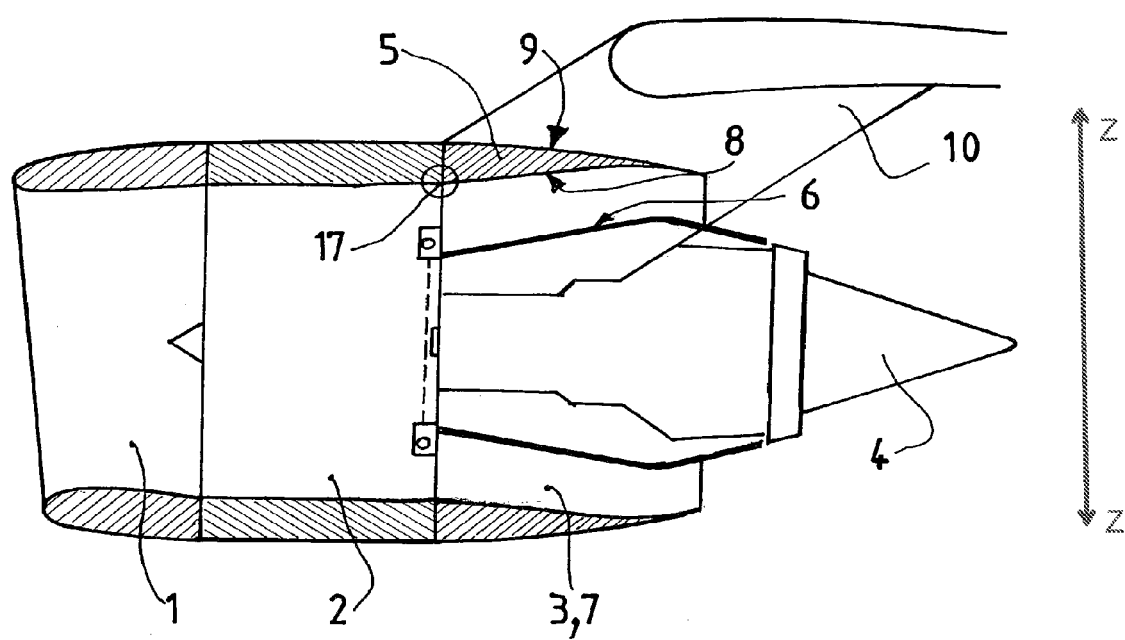
FIG. 1 is a schematic view of a nacelle in longitudinal section.

FIG. 1 depicts a nacelle according to the invention, intended to equip an aircraft. The latter has a tubular structure comprising an air intake 1 forward of the turbojet engine, a middle section 2 intended to surround a fan of the turbojet engine, a rear section 3 able to house thrust reversal means and intended to surround the combustion chamber of the turbojet engine, and is closed by a jet pipe 4 the outlet of which is situated downstream of the turbojet engine.

The nacelle is intended to house a bypass turbojet engine able, via the blades of the rotating fan, to generate a flow of hot air (also known as the primary flow) from the turbojet engine combustion chamber.

The nacelle has an outer structure 5 which, together with a concentric inner structure 6, defines an annular flow duct 7, also known as a flow path, intended to channel a flow of cold air, known as the secondary air, which passes around the outside of the turbojet engine. The primary and secondary flows are ejected from the turbojet engine via the rear of the nacelle.

Figure 2:
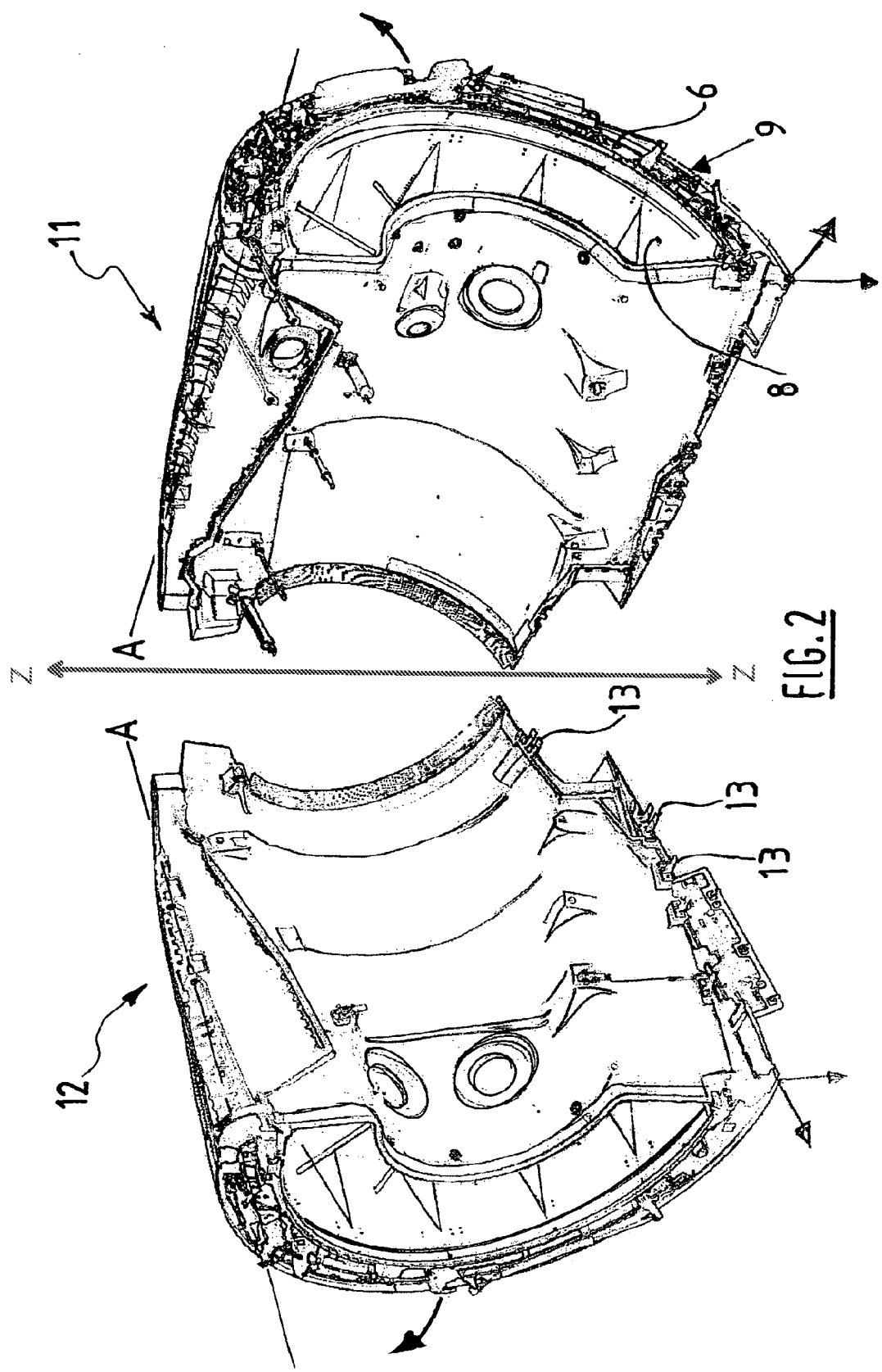
FIG. 2 is an exploded view of the rear section of the nacelle, in perspective.
Figure 3:
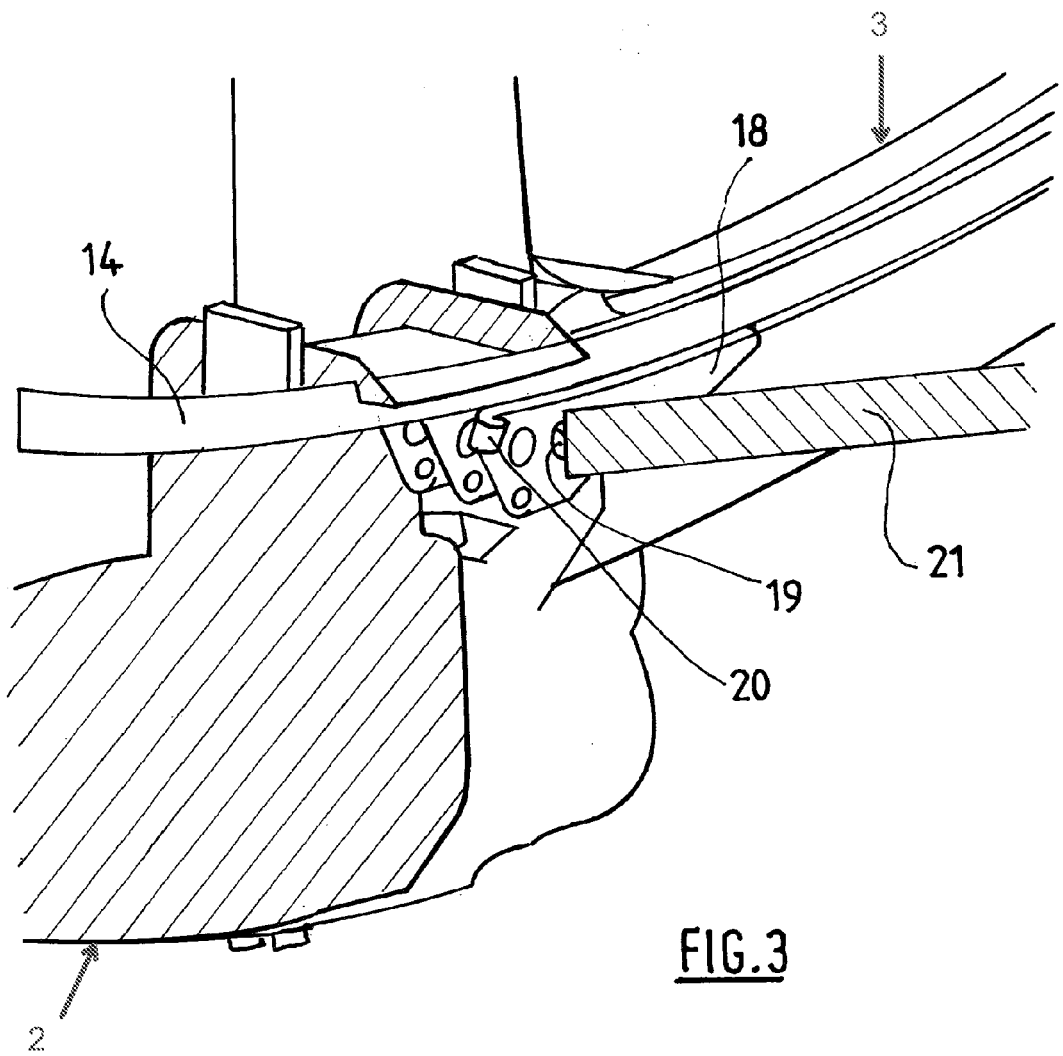
FIG. 3 is an enlarged view, in perspective, of the region of the first half-shell situated some distance from the axis of rotation.

As can be seen more specifically in FIG. 2, the outer structure 5 comprises an inner cowling 8 and an outer cowling 9.

Each aircraft propulsion unit is thus formed of a nacelle and of a turbojet engine, and is suspended from a fixed structure of the aircraft, for example under a wing or on the fuselage, by means of a pylon or strut 10 attached to the turbojet engine or to the nacelle.

As can be seen in FIG. 2, the rear section 5 of the nacelle is formed of a first and of a second half-shell 11, 12 of substantially semicylindrical shape, one on each side of a longitudinal vertical plane of symmetry of the nacelle, and mounted so that they can move in such a way that they can be deployed between a work position and a maintenance position with a view to providing access to the turbojet engine. The two half-shells 11, 12 are each pivot-mounted about an axis A that forms a hinge at the top part (in the 12 o'clock position) of the nacelle. The half-shells are kept in the closed position by latching devices 13 positioned along a meeting line situated in the bottom part (in the 6 o'clock position). The Z-Z direction indicates a direction parallel to an axis passing the top part (in the 12 o'clock position) and the bottom part (in the 6' o'clock position) of the nacelle when the half-shells are in the closed position.

The middle and rear sections 2, 3 are, in the conventional way, joined together by a frame 14 that is fixed with respect to the turbojet engine, the first and second half-shells being equipped with positioning means which, in the work position, collaborate with complementary positioning means created on the fixed frame.

Figure 4:
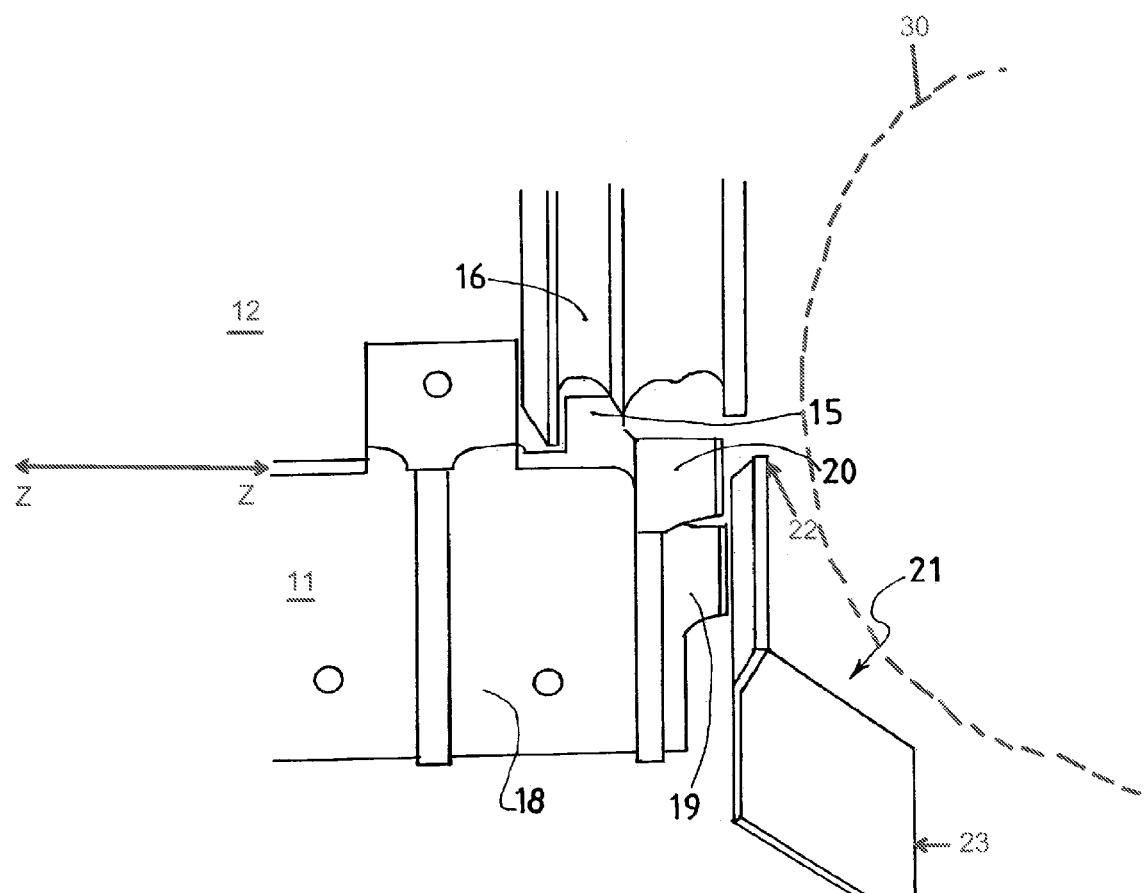
FIG. 4 is a side view.

As is more particularly clear from FIG. 4, the positioning means comprise a beveled annular knife edge 15 of V-shaped overall profile provided at one of the first and second half shell 11, 12. The complementary positioning means defines a groove 16 of complementary shape and complementary profile at the other one of the first and second half shell 11, 12.

The annular knife edge 15 is more particularly positioned level with the front edge 17 of the inner cowling 8 of the outer structure 5.

Each half-shell is equipped, at the front edge 17 of the inner cowling 8, with a mounting plate 18 positioned at the lower end of the inner cowling 8 of the outer structure 5.

The mounting plate 18 is equipped with a first and with a second follower lump 19, 20 projecting toward the middle section 2. The second lump 20 is angularly offset from the first 19 with respect to the axis of rotation A of the corresponding half-shell. The second lump 20 is positioned at the lower end of the aforementioned inner cowling 8 and near the opposite half-shell 12. The first lump 19 is disposed further away from the opposite half-shell 12 than the second lump 20.

Furthermore, the propulsion assembly formed by the nacelle and the turbojet engine 30 is equipped with a guide ramp 21 that is fixed with respect to the turbojet engine 30 and attached to the fixed frame 14.

As is more particularly apparent from FIGS. 4 to 7, the ramp 21 has a first end 22, facing toward the opposite half-shell, and a second end 23, at the opposite end to the first.

The ramp 21 delimits three distinct sections, namely, in succession, an engagement section 24 positioned at the first end 21, a first bearing section 25 and a second bearing section 26, the latter being positioned at the second end 23.

The ramp 21 thus has three flat faces facing toward the rear section and against which the follower lumps bear as detailed hereinbelow, these namely being an engagement face 27, a first guide face 28 and a second guide face 29.

The second guide face 29 makes an angle with the first guide face 28. More specifically, the first guide face 28 is substantially parallel to the rear section front face 3, the second guide face 29 being inclined toward the middle section 2.

Likewise, the engagement face 27 is inclined toward the middle section 2.

Furthermore, the second end 23 is radially distanced outward with respect to the first end 22, so as to replicate the deformation of the corresponding half-shell, as detailed hereinafter.

According to an embodiment variant, the ramp 21 could be curved without having distinct flat sections.

The way in which the nacelle operates will now be described in greater detail.

When the nacelle is in the work position, the half-shells 11, 12 are close to one another and the annular knife edge 15 of each half-shell is housed in the corresponding groove 16.

Figure 5:
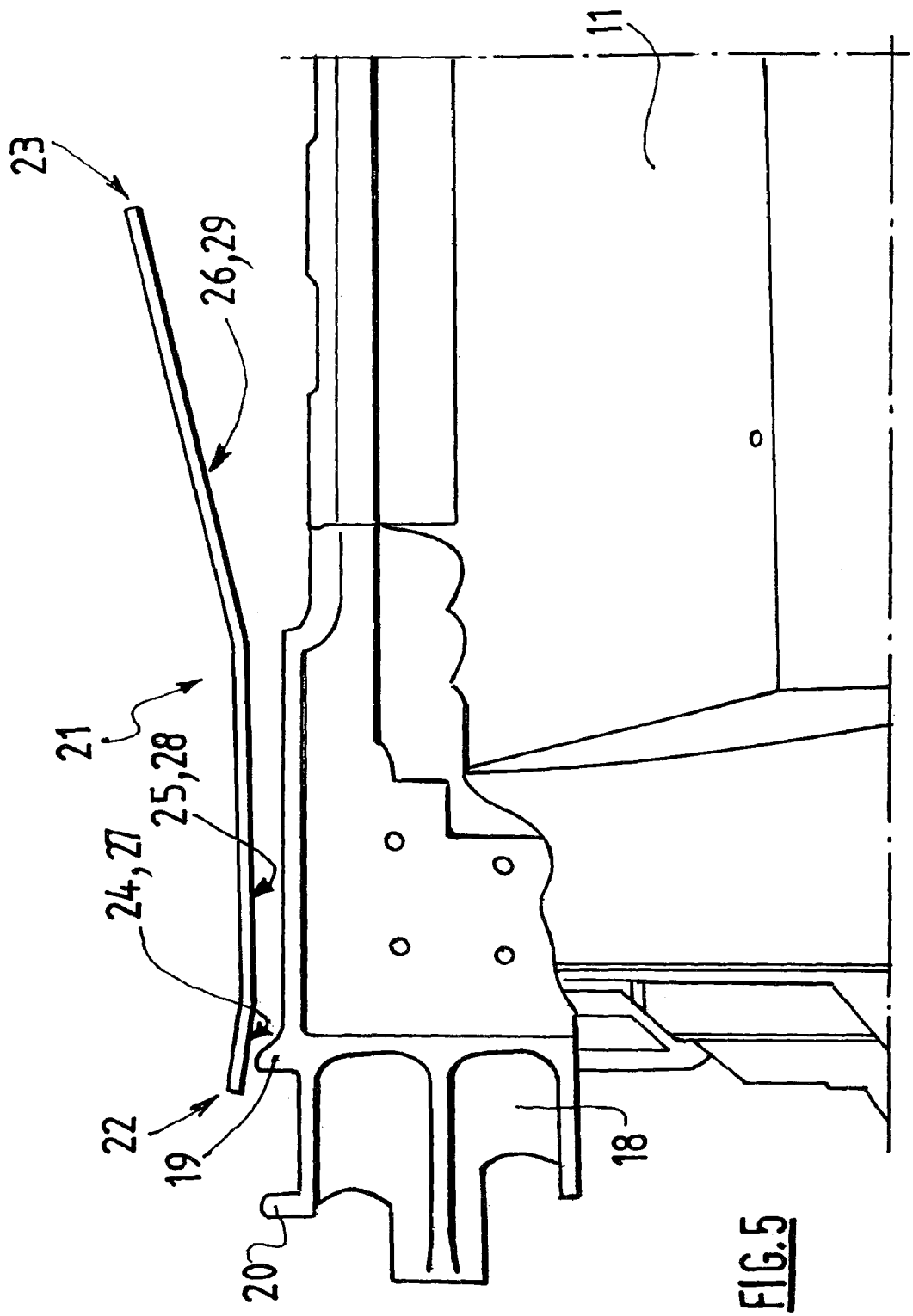
FIGS. 5 to 7 are views of the first half-shell from above in three successive positions.
Figure 6:
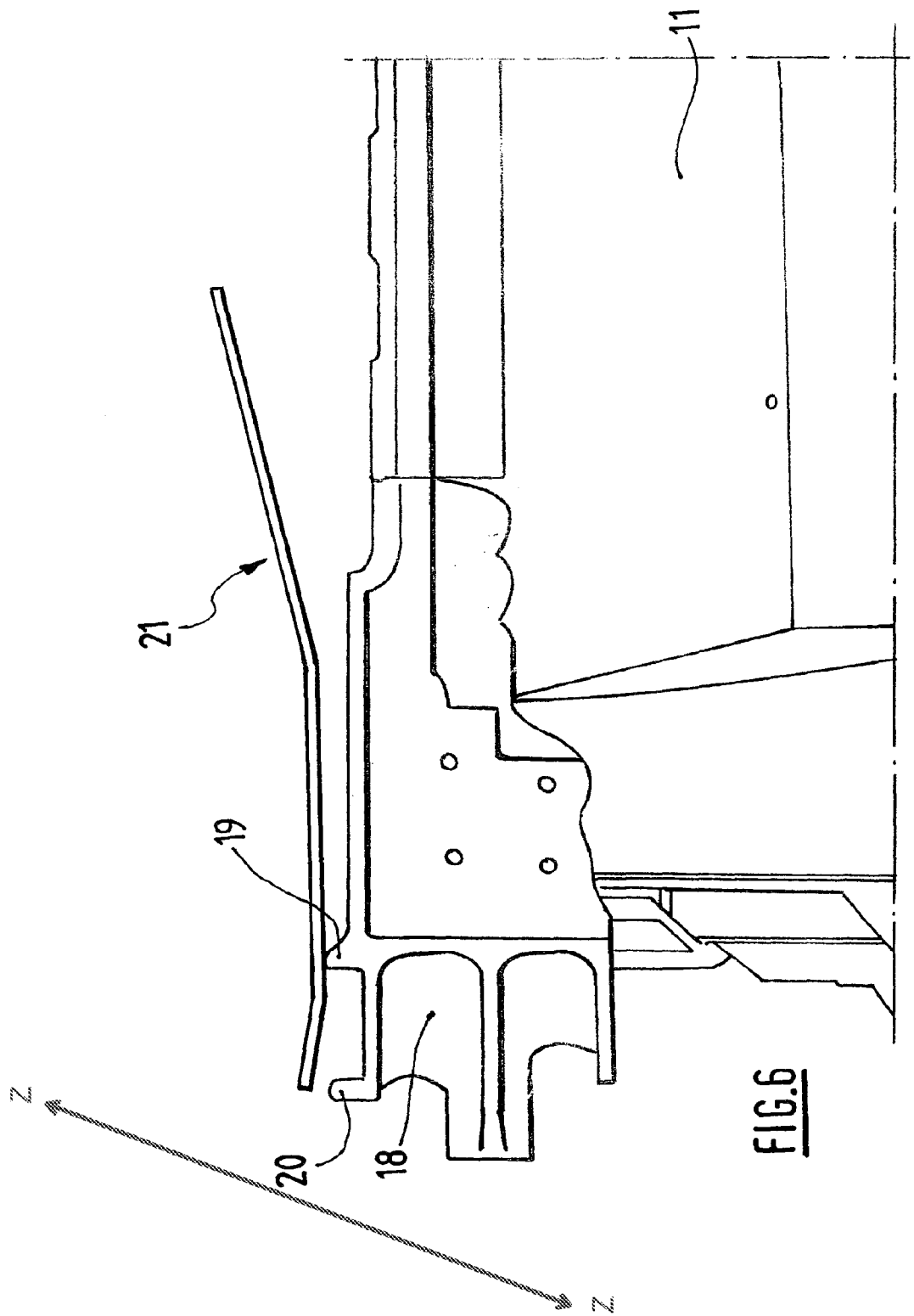
Figure 7:
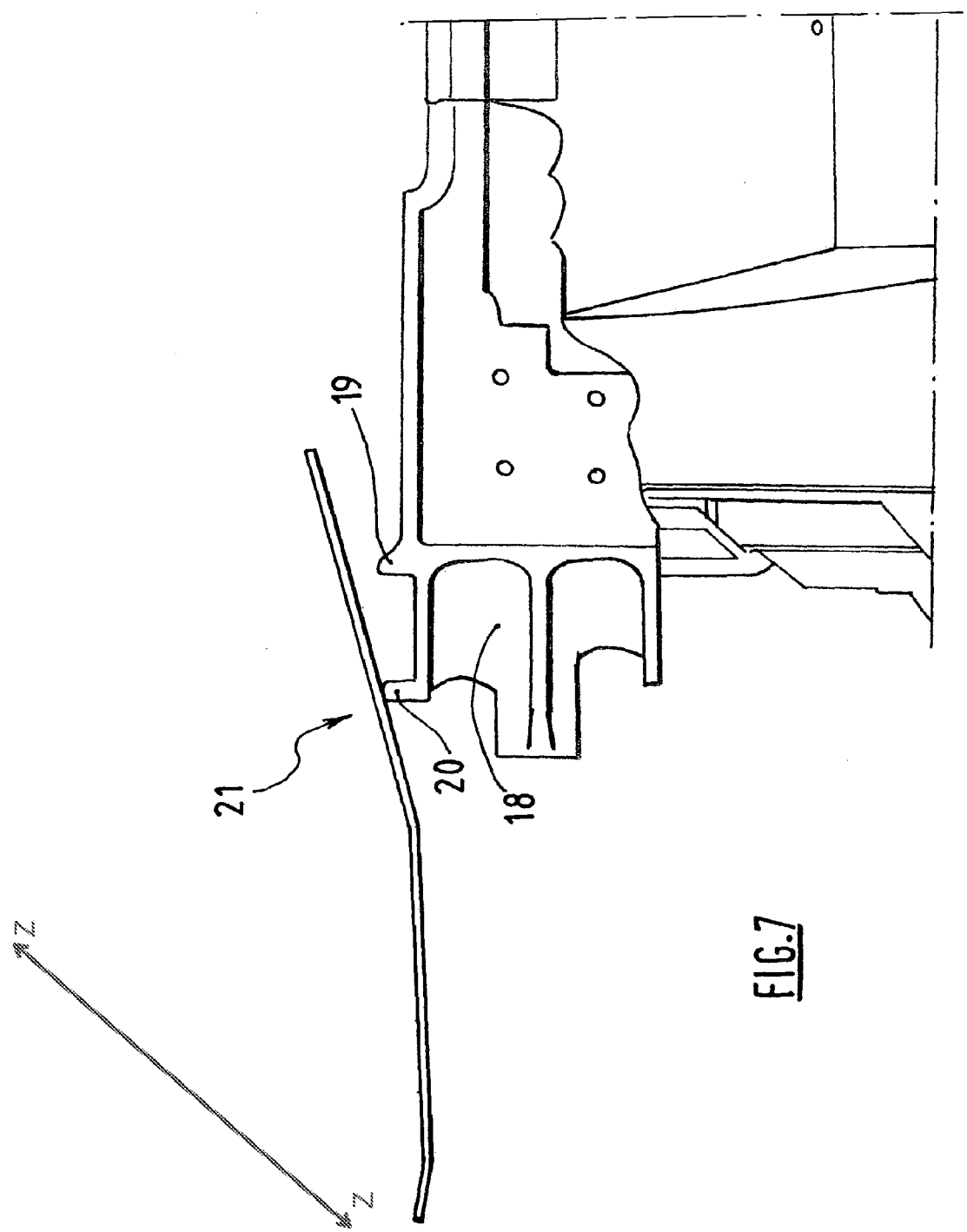

As depicted in FIG. 5, the follower lumps 19, 20 do not bear against the ramp 21 in the work position, the half-shells being kept in position by the aforementioned knife edges and grooves 15, 16.

During a maintenance operation, it is necessary to rotate at least one of the two half-shells between the work position identified by an angular position at 0° and the maintenance position identified by an angular position at between 30 and 50°.

In a first phase of separation, for example of the first half-shell 11 the latter moves from the 0° C. position to a position at 0.3° so as to clear the annular knife edge 15 from the corresponding groove 16. The first lump 19 then comes to bear against the engagement face 27 and the first half-shell 11 is then able to deform slightly, although the deformation is limited by the fact that the first lump 29 is bearing against the ramp 21.

In a second phase of separation, the first half-shell 11 moves from its position at 0.3° to a position at 4°. In this second phase of separation the first lump 19 moves along the first guide face 28, then the second lump 20 also comes to bear against the first guide face 28, and then finally the first lump 19 clears the first guide face 28.

In a third phase of separation, the first half-shell moves from its position at 4° to a position at 7°. In this third phase of separation, the second lump 20 comes into contact with the second guide face 29 and moves along the latter until it reaches the second end 23 of the ramp 21. Because the second guide face 29 widens toward the middle section 2, the first half-shell 11 is gradually deformed as it rotates, both toward the middle section 2 and downward. Because the second end 23 is radially offset outward, the ramp 21 permits replication of the outward radial movement of the second lump 20.

In the position at 7°, the second lump 20 leaves the ramp 21 at the second end 23 which means that the deformation of the first half-shell 11 is no longer limited by the ramp 21. The follower lumps 19, 20 and the ramp 21 are designed so that the 7° position corresponds to the maximum deformation of the first half-shell 11. In this way, when the second follower lump 20 leaves the ramp 21, the first half-shell 11 does not have any tendency to deform further. This makes it possible, as the first half-shell 11 moves from its maintenance position to its work position, to ensure that the second lump 21 can once again engage correctly with the second guide face 29.

Thus, the follower lumps 19, 20 and the bearing ramp 21 are active over only part of the angular travel of the first half-shell 11, namely between the position at 0.3° and the position at 7°. Beyond that, the risk of interference between the first half-shell 11 and the remainder of the nacelle is zero because of the overall structure of the nacelle.

The principle of operation is the same for the second half-shell 12 and will therefore not be described further in detail.

According to an embodiment variant that has not been depicted, the nacelle could be equipped with two distinct ramps, each lump coming to bear against one ramp.

It goes without saying that the invention is not restricted to the sole embodiment of this turbojet engine nacelle that has been described hereinabove by way of example, but on the contrary encompasses all variants.

The invention claimed is:

1. A nacelle of a turbojet engine, intended to be fitted to an aircraft, comprising:
   an air intake front section,
   a middle section intended to surround a fan of the turbojet engine, and
   a rear section formed of at least a first and a second half-shell mounted such that they are able to rotate about an axis so that each can be deployed between a work position in which the half-shells are close together and a maintenance position in which the half-shells are distanced from one another, the first half-shell comprising:
- a first follower element in a region situated some distance from an axis of rotation, the first follower element being designed to bear against a first guide element that is fixed with respect to the turbojet engine as the first half-shell rotates to a first phase of separation of the maintenance position; and
- a second follower element, angularly offset from the first follower element with respect to the axis of rotation of the first half-shell, the second follower element designed to bear against a second guide element that is fixed as the first half-shell rotates to a second phase of separation of the maintenance position, wherein the first follower element and the second follower progressively bear against the first and second guide elements during movement into the maintenance position and do not bear against the first and second guide elements in the work position.

2. The nacelle as claimed in claim 1, wherein the first and second follower elements respectively comprise a first and a second protruding lump, the first and second guide means comprising at least one bearing ramp against which the first and second lumps bear as the first half-shell rotates.

3. The nacelle as claimed in claim 2, wherein the bearing ramp is a single bearing ramp having a first and a second section, these being positioned in continuation of one another and defining a first and a second guide face respectively forming the first and the second guide elements, the first lump coming to bear against the first guide face at least, the second lump coming to bear against the second guide face at least.

4. The nacelle as claimed in claim 3, wherein the first and second guide faces make an angle with one another.

5. The nacelle as claimed in claim 1, wherein the first and/or the second follower elements are designed to bear against the first and/or the second guide elements over only part of the travel of the first half-shell.

6. The nacelle as claimed in claim 5, wherein, when the nacelle is in the work position, the first and second follower elements are distanced from the first and second guide elements.

7. The nacelle as claimed in claim 5, wherein the first half-shell can be rotated through an angular travel of between 40 and 60°, the first and the second follower elements collaborating with the first and the second guide elements over an angular travel of between 5 and 10°.

8. The nacelle as claimed in claim 7, wherein the work position is identified by an angular position at 0°, the maintenance position being identified by an angular position at between 40 and 60°, the follower elements and the guide elements being arranged in such a way that the first follower element bears against the first guide element in an angular position between about 0.3° and 4°, the second follower element bearing against the second guide element in an angular position of between about 4 and 7°.

9. The nacelle as claimed in claim 1, wherein the first and second guide elements are fixed to a frame that is fixed with respect to the turbojet engine, allowing the rear section to be attached to the middle section.

10. The nacelle as claimed in claim 3, wherein the bearing ramp has a first and a second end, the first and second lumps moving along the ramp in the direction from the first end toward the second end as the first half-shell moves from the work position toward the maintenance position, the second end being radially distanced outward with respect to the first end.

11. The nacelle as claimed in claim 10, wherein the second end is distanced away from the first end in the direction of the middle section.

* * * * *